Aug. 18, 1953 W. H. KEMP 2,648,993
STEERING COLUMN BRAKE
Filed Feb. 19, 1951 2 Sheets-Sheet 2
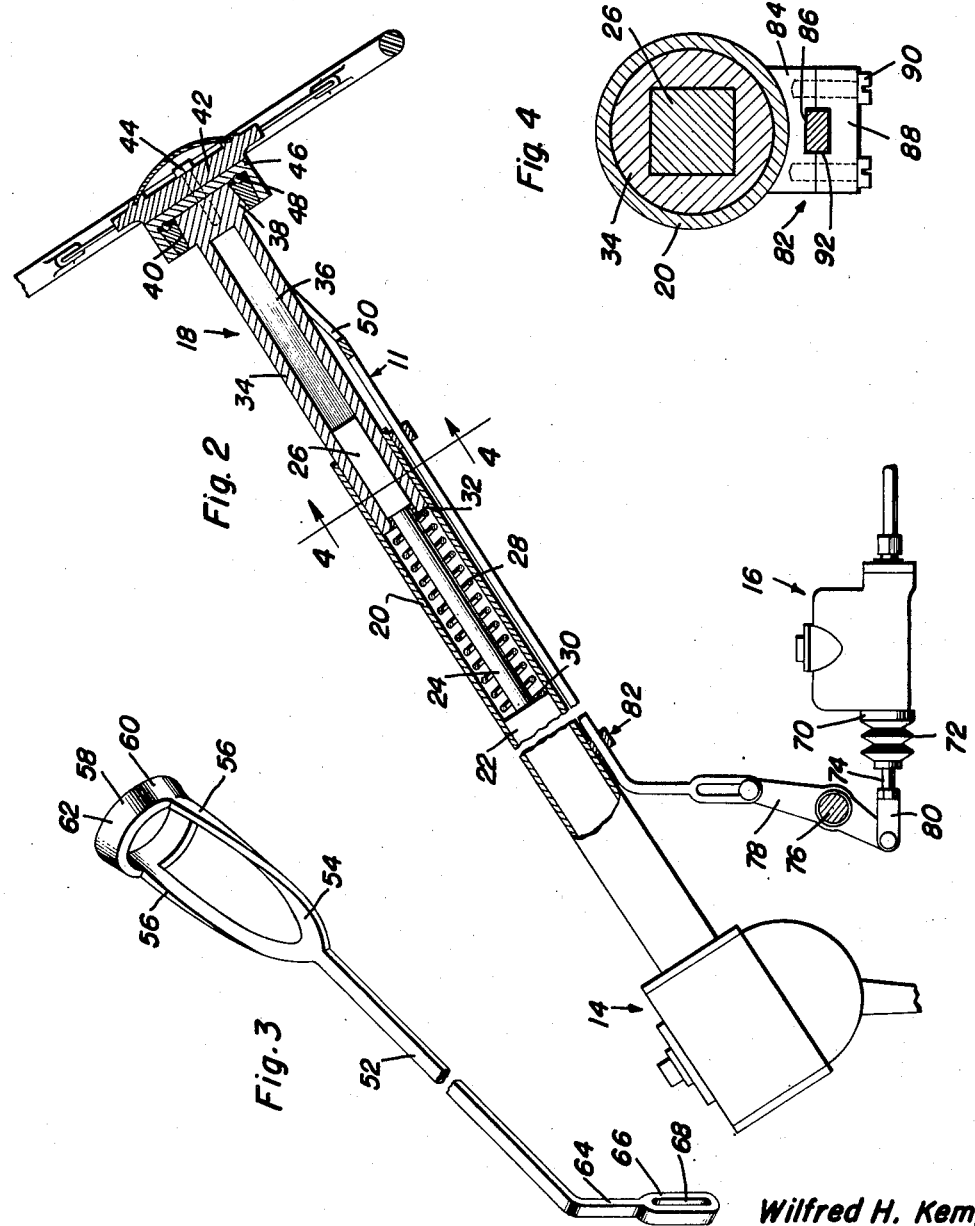
Wilfred H. Kemp
INVENTOR.

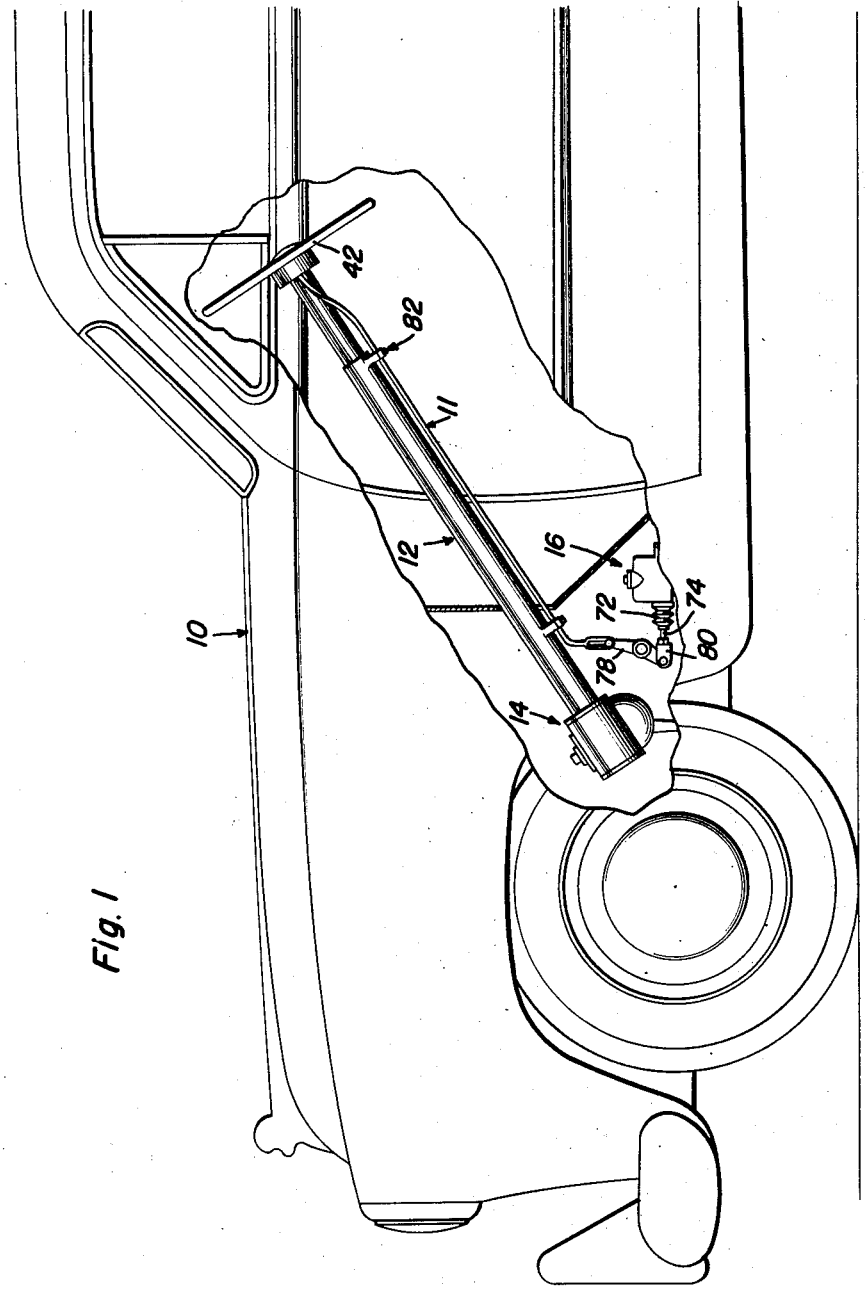

Patented Aug. 18, 1953

2,648,993

UNITED STATES PATENT OFFICE 2,648,993

STEERING COLUMN BRAKE

Wilfred H. Kemp, Buffalo, N. Y.

Application February 19, 1951, Serial No. 211,697

4 Claims. (Cl. 74—486)

The present invention relates to improvements in braking apparatus for automotive vehicles and the like and more particularly to a brake apparatus which is adapted to be mounted on a steering column for association therewith whereby reciprocation of the steering wheel will effect actuation of the conventional brake cylinder of an automotive vehicle whereby the wheel brakes can be applied for stopping the vehicle.

An object of the present invention is to provide a steering column brake apparatus which is effective upon reciprocation of the steering wheel, a connecting means being interposed between the steering wheel and a brake cylinder for effecting reciprocation of the plunger within the brake cylinder whereby compressed fluid may be supplied to urge the brake bands against the brake drums of the wheels of a motor vehicle.

A further object of the present invention resides in the novel arrangement of the steering column means as having a lower hollow tubular standard in which a steering shaft is rotatably disposed and has a non-circular upper end, a sleeve fixedly connected to the steering wheel being reciprocably engaged in the standard and reciprocably non-rotatively receiving the upper end of the shaft whereby a steering wheel may be rotated with respect to the tubular standard for effecting rotation of the steering shaft and whereby the steering wheel may be reciprocated with respect to both the tubular standard and the steering shaft.

Still another object of the present invention is to provide a resilient means interposed between the lower end of the sleeve and an intermediate portion of the steering shaft whereby the steering wheel will be outwardly urged for normally maintaining the connecting means in operative position.

Another object of the present invention is to provide a connecting means which is formed with a bearing portion at its upper end for rotatively engaging the steering wheel and whereby the connecting means is reciprocated by the steering wheel but will be held from rotation with respect to the steering wheel.

Various other objects and advantages will become apparent from the detailed description to follow. The best form in which I have contemplated applying my invention is clearly illustrated in the accompanying drawings, wherein:

Figure 1 is a side elevational view of a conventional motor vehicle with parts broken away and showing the steering column brake apparatus of the present invention mounted on the steering column;

Figure 2 is a detail view of the steering column and associated brake means with parts in section and parts broken away;

Figure 3 is a detail perspective view of the connecting means employed in combination with the brake apparatus of the present invention; and, Figure 4 is a vertical transverse sectional view taken substantially along the plane of line 4—4 of Figure 2.

Referring more particularly to the drawings, wherein like numerals designate like parts throughout, the numeral 10 designates generally a conventional motor vehicle having a steering column 12 and steering gear 14 with a conventional brake cylinder 16 supported therebelow. The steering column brake apparatus is best shown in Figure 2, as comprising a steering column being formed of an upwardly extending hollow tubular standard 20 having a steering shaft 22 axially mounted therein for rotation with respect thereto. A steering shaft 22 has a reduced axially extending portion 24 integrally formed therewith and terminating in a non-circular enlarged end portion 26. A compression spring 28 is interposed between the shoulder 30 and shoulder 32, of the steering shaft 22 and lower end of the sleeve 34 respectively.

The sleeve 34 is reciprocably and rotatively received in the standard 20 and has a non-circular bore 36 therethrough for non-rotatably and reciprocably receiving the non-circular end of the steering shaft 22. The upper end of the sleeve 34 is of enlarged construction at 38 and has a beveled outer surface 40 for a purpose to be hereinafter described.

Secured to the upper end of the enlarged portion 38 is a conventional steering wheel 42, a bolt 44 being employed for screwing the steering wheel to the sleeve 34. A recessed element 46 is interposed between the steering wheel 42 and enlarged portion 38 and has a plurality of ball bearings 48 received in the base of the recess for a purpose to be hereinafter described.

A connecting means 11 of the present invention includes a connecting bar 50 which is formed of an elongated shank portion 52 terminating at its upper end in a bifurcated portion 54 having arcuated legs 56. The legs 56 are integrally formed with a bearing ring 58 which has a beveled outer surface 60 and a bearing raised surface 62 on its upper end. The bearing ring 58 is received in the recess of the member 46 for engagement against the ball bearings 48 over the enlarged end portion 38 of the sleeve 34. It will thus be seen that rotation of the steering wheel 42 and sleeve 34 will not effect rotation of the connecting means 11 but that reciprocation of the steering wheel 42 will effect longitudinal movement of the connecting means 11.

The lower end of the shank portion 52 is downwardly angulated at 64 and terminates in an enlarged portion 66 having a slot of elongated form 68 formed therein.

The brake cylinder 16 is formed with an opening 70 at the end nearest to the steering gear 14 and a bellows 72 is secured thereon for sealingly receiving the plunger shaft 74 of a piston positioned within the brake cylinder 16. A pivot shaft 76 is transversely supported within the vehicle and juxtaposed to the plunger 74 for pivotably receiving the pivot link 78 thereon. The lower end of the pivot link 78 is pivotably secured to the connector 80 of the plunger 74. The upper end of the pivot link 78 is pivotably and reciprocably connected to the large end of the connecting means 11.

Intermediate portions of the connecting means 11 are reciprocably supported by means of the bearing supports 82, as best shown in Figure 4. The bearing supports 82 include bosses 84 integrally formed on the standard 20 and having a rectangular recess 86 formed therein. Plates 88 are secured to the boss 84 by means of the screws 90 and have complementary recesses 92 formed therein whereby the rectangular shank portion 52 of the connecting means 11 can be reciprocably received within the rectangular recess formed by the complementary recesses 86 and 92.

In view of the foregoing description, taken in conjunction with the accompanying drawings, it is believed that a device has been provided which will accomplish all of the objects herein above set forth.

The operation of the steering column brake apparatus should be obvious from a consideration of the foregoing. Reciprocation of the steering wheel 42 will effect downward movement of the connecting means 11, whereby the pivot link 78 will be pivoted about the pivot shaft 76 and the plunger 74 will be inwardly urged within the cylinder 16 for compressing the fluid therein and actuating the brake bands against the brake drums. At the same time, the operator of the motor vehicle may turn the steering wheel without in any way affecting the effective operation of the braking apparatus. Thus, the motor vehicle may be turned and braked by simply manipulating the steering wheel.

Having described the invention, what is claimed as new is:

1. A steering column brake comprising an extensible steering column means having a lower hollow tubular standard, a steering shaft rotatably disposed in said standard and having a noncircular upper end, a sleeve reciprocably engaged in said standard and reciprocably and non-rotatably receiving the upper end of said shaft, said sleeve having the steering wheel secured thereto for reciprocation thereby, a connecting means rotatably secured for reciprocation with said steering wheel at its upper end and having its lower end connected to a pivot link, a plunger associated with the brake cylinder of a motor vehicle, said pivot link connected to said plunger for reciprocating the same upon reciprocation of said steering wheel.

2. A steering column brake comprising an extensible steering column means having a lower hollow tubular standard, a steering shaft rotatably disposed in said standard and having a non-circular upper end, a sleeve reciprocably engaged in said standard and reciprocably and non-rotatably receiving the upper end of said shaft, said sleeve having the steering wheel secured thereto for reciprocation thereby, a connecting means rotatably secured for reciprocation with said steering wheel at its upper end and having its lower end connected to a pivot link, a plunger associated with the brake cylinder of a motor vehicle, said pivot link connected to said plunger for reciprocating the same upon reciprocation of said steering wheel, said connecting means including an elongated shank portion, one end of said shank portion having an angulated portion secured thereto, said angulated portion being enlarged and having a slot therethrough for receiving one end of said pivot link, the other end of said shank portion having a bifurcated portion integrally formed therewith and having a bearing ring secured thereto.

3. A steering column brake comprising an extensible steering column means having a lower hollow tubular standard, a steering shaft rotatably disposed in said standard and having a non-circular upper end, a sleeve reciprocably engaged in said standard and reciprocably and non-rotatably receiving the upper end of said shaft, said sleeve having the steering wheel secured thereto for reciprocation thereby, a connecting means rotatably secured for reciprocation with said steering wheel at its upper end and having its lower end connected to a pivot link, a plunger associated with the brake cylinder of a motor vehicle, said pivot link connected to said plunger for reciprocating the same upon reciprocation of said steering wheel, and bearing means interposed between said connecting means and said steering wheel, said connecting means including an elongated shank portion, one end of said shank portion having an angulated portion secured thereto, said angulated portion being enlarged and having a slot therethrough for receiving one end of said pivot link, the other end of said shank portion having a bifurcated portion integrally formed therewith and having a bearing ring secured thereto for engagement with said bearing means.

4. A connecting means comprising an elongated shank portion, one end of said shank portion having an angulated portion secured thereto, said angulated portion being enlarged and having a slot therethrough adapted to receive one end of a pivot link, the other end of said shank portion having a bifurcated portion integrally formed therewith including a pair of laterally spaced parallel legs and having a bearing ring integral therewith.

WILFRED H. KEMP.

References Cited in the file of this patent

UNITED STATES PATENTS

| Number | Name | Date |
|---|---|---|
| 1,870,525 | Nagamatsu | Aug. 9, 1932 |
| 1,873,458 | Mumane | Aug. 23, 1932 |
| 2,180,430 | Reitz | Nov. 21, 1939 |
| 2,197,671 | Vergara | Apr. 16, 1940 |
| 2,200,625 | Koppel | May 14, 1940 |
| 2,207,954 | Tate | July 16, 1940 |
| 2,494,547 | Fish | Jan. 17, 1950 |
| 2,511,165 | Lyman | June 13, 1950 |
| 2,563,339 | Kellogg | Aug. 7, 1951 |